(12) United States Patent
West et al.

(10) Patent No.: US 11,794,541 B2
(45) Date of Patent: Oct. 24, 2023

(54) VEHICLE LIFT KIT

(71) Applicant: TRUCKS AND TRAILS, INC., Thomasville, GA (US)

(72) Inventors: James Clinton West, Thomasville, GA (US); Timothy Wyche, Tallahassee, FL (US); Yanqing Wu, Washington, IN (US)

( * ) Notice: Subject to any disclaimer, the term of this patent is extended or adjusted under 35 U.S.C. 154(b) by 0 days.

(21) Appl. No.: 17/362,537

(22) Filed: Jun. 29, 2021

(65) Prior Publication Data

US 2021/0402839 A1 Dec. 30, 2021

Related U.S. Application Data

(60) Provisional application No. 63/045,539, filed on Jun. 29, 2020.

(51) Int. Cl.
*B60G 11/02* (2006.01)
*B60G 3/20* (2006.01)

(52) U.S. Cl.
CPC ............... *B60G 11/02* (2013.01); *B60G 3/20* (2013.01); *B60G 2200/46* (2013.01); *B60G 2200/462* (2013.01); *B60G 2202/11* (2013.01); *B60G 2300/26* (2013.01)

(58) Field of Classification Search
CPC .. B60G 3/20; B60G 2300/26; B60G 2202/11; B60G 11/02
See application file for complete search history.

(56) References Cited

U.S. PATENT DOCUMENTS

| | | | |
|---|---|---|---|
| 1,474,057 A * | 11/1923 | Pridemore | B62D 7/18 384/396 |
| 5,722,784 A | 3/1998 | Link | |
| 7,581,740 B1 | 9/2009 | Stimely | |
| 8,801,037 B1 * | 8/2014 | Inoue | B62D 21/183 280/787 |
| 9,421,837 B2 * | 8/2016 | Lake | B60G 15/06 |
| 10,343,476 B2 | 7/2019 | Zhang | |
| 10,351,169 B2 | 7/2019 | Zhang | |

(Continued)

FOREIGN PATENT DOCUMENTS

| | | | | |
|---|---|---|---|---|
| CN | 105673752 A * | 6/2016 | ............. | B60G 11/02 |
| CN | 113002257 A * | 6/2021 | | |

(Continued)

*Primary Examiner* — James A Shriver, II
*Assistant Examiner* — Maxwell L Meshaka
(74) *Attorney, Agent, or Firm* — Brian D. Bellamy

(57) ABSTRACT

A vehicle lift kit for a golf cart is disclosed. The lift kit comprises a front suspension attached to a vehicle frame having a suspension body, a pair of lower control arms, a leaf spring, and a pair of spindles connected to the pair of lower control arms. Each spindle comprises a spindle shaft, an upper bracket, and a lower bracket. The upper control arms are configured to connect between a steering rack mount of the vehicle and the upper end of the spindle. Further, the lift comprises a camber alignment adjustment on the connector between the upper control arm and the upper bracket of the spindle to provide proper alignment. The spindle further comprises a support gusset to strengthen the joints. The lift kit also has grease fittings to provide lubrication of the mounting points. Further, the lift kit comprises a rear suspension kit for the golf cart.

13 Claims, 10 Drawing Sheets

(56) References Cited

U.S. PATENT DOCUMENTS

| | | |
|---|---|---|
| 11,207,933 B2 | 12/2021 | Zhang |
| 2008/0067774 A1 | 3/2008 | Sanville et al. |
| 2016/0159183 A1* | 6/2016 | Basin .................... B60G 13/04 280/124.108 |
| 2018/0354329 A1* | 12/2018 | Zhang .................... B60G 11/08 |
| 2021/0046794 A1* | 2/2021 | Zhang .................... B60G 15/02 |

FOREIGN PATENT DOCUMENTS

| | | | | |
|---|---|---|---|---|
| EP | 4074526 A1 * | 10/2022 | ............. | B60G 11/02 |
| FR | 3054517 A1 * | 2/2018 | ............... | B60G 1/00 |

\* cited by examiner

VEHICLE LIFT KIT

FIELD OF THE INVENTION

The present invention generally relates to a vehicle lift kit. More specifically, the present invention relates to a vehicle lift kit with an improved double A-arm front suspension for a utility vehicle, such as a golf cart, configured to provide improved control for lifting the vehicle.

BACKGROUND

Small utility vehicles, such as golf carts or vehicles of similar size and features, are modern vehicles designed for the movement of the people inside golf resorts, personal grounds, neighborhoods, farms, and other areas within the vehicle's driving range. For example, recreational golfers use the golf cart for carrying themselves and required equipment around a golf course. Also referred to herein as a cart or vehicle, the small utility vehicle installed with large wheels and tires has become very popular in recent days. The cart has larger wheels and tires installed to provide greater ground clearance and enhance the appearance of the small utility vehicle. Installing golf carts with larger wheels and tires is a challenge. Some of the tires do not fit under the cart's body, or the lift kit is not flexible to change the axle heights from the ground and adjust the stiffness of the shocks.

A wide variety of vehicle or automobile lift kits have been previously known and used for lifting vehicles off the ground for appearance, function, or so that tire installation, maintenance, and service can be performed thereon. The lift kit consists of a front and rear suspension kit supporting to lift the vehicle relative to the ground to increase its clearance. This allows the use of larger tires to travel off-road or over rugged terrain. Any imbalance in suspension height may result in decreased ride quality.

In a vehicle suspension, a control arm or A-arm, form the core of a front suspension system. The control arms are a hinged suspension link between the front suspension and the hub that carries the wheel. The control arms are connected to the front wheel with the arms attaching to the frame of the car. The control arms are used to carry the suspension load and transmit it to the spring or shock absorber.

Manufacturers today built double A-arm kits. FIG. 1 illustrates a cart lift kit 10 that uses a rod end bearing, also known as Heim joint as a mechanical articulating joint for controlling the wheels of the cart 200. The Heim joint is used on the ends of the control rods and steering links. The Heims joints are designed to withstand forces in pushing or pulling applications and are strong in those types of applications. These joints are not well-suited to carry a direct downward weight load like is needed in a lift kit application. The Heims joint in the lower A-arms carries all the weight and impact on the suspension when it goes over different types of terrain. To make it even worse, all of the weight is directly on the articulating ball which is pressed in. This ball is the direct mounting point that the spindle attaches to and turns with the spindle. This joint eventually fails. When a failure occurs the wheel folds up into the wheel housing and steering control is lost. The joint fails in one of the two ways. It either shears or the articulating ball pushes through the housing. Most of the failure occurs in the joints in the lower A-arms because all the weight and impact are on the joint. The joint in the upper A-arms rarely ever fail unless there is a direct type of impact like a collision. The upper joint is just a stabilizer for the upper suspension and does not have any weight load which is what this type of joint was designed to do.

The front suspension used on a club car precedent uses a kingpin joint but does not use a double A-arm. The model uses an upper A-arm and single inverted leaf spring in place of lower A-arms. The kingpins are attached directly to the leaf spring. Connecting a kingpin joint to a leaf spring is not a good option for a lifted cart. Lower control arms offer more stability and strength, which is needed due to the user changes of a cart after it has been lifted, and lifted carts are commonly used off-road and in rough terrain. Therefore, the Heim joints on lifted carts with double A-arm lift kits fail.

In light of the above-mentioned drawbacks, there is a need for an improved joint for controlling golf carts with lift kits. Also, there is a need for a shock mount at both the control arms to withstand weight and impact on the suspension.

SUMMARY OF THE INVENTION

The present invention generally discloses a vehicle lift kit. Also, the present invention discloses a vehicle lift kit for an improved joint for controlling golf carts. Further, the present invention discloses a vehicle lift kit with a shock mount at both the control arms to withstand weight and impact on the suspension.

In one embodiment, the vehicle lift kit is provided with an improved double A-arm for front suspension. In one embodiment, the double A-arm comprises an improved joint for controlling golf carts with lift kits. In one embodiment, the double A-arms withstand weight and impact on the suspension. In one embodiment, the vehicle lift kit further comprises a rear suspension kit for the golf cart.

In one embodiment, the vehicle kit comprises a front suspension configured to attach to a vehicle frame. In one embodiment, the front suspension comprises a suspension body or front frame, a pair of lower control arms, and a leaf spring. In one embodiment, the pair of lower control arms include a first lower control arm and a second lower control arm. In one embodiment, the lower control arms are extending laterally from the sides of the suspension body. In one embodiment, the leaf spring extends laterally from the sides of the suspension body.

In one embodiment, the vehicle lift kit further comprises a pair of spindles including a first spindle and a second spindle. In one embodiment, the spindles are configured to connect to the distal end of the lower control arms, respectively. Each spindle comprises a spindle shaft, an upper bracket, and a lower bracket. The spindle shaft includes an upper brass bushing at its upper end and a lower brass bushing at its lower end.

In one embodiment, the first spindle comprises a first spindle shaft having an upper end and a lower end. The first spindle further comprises a first upper bracket at its upper end and a first lower bracket at its lower end. In one embodiment, the first spindle further comprises a first support gusset configured to strengthen the joints by transferring the stress between the connecting points. In one embodiment, the vehicle lift kit further comprises one or more first grease fittings configured to provide lubrication of the mounting points.

In one embodiment, the second spindle comprises a spindle shaft having an upper end and a lower end. The second spindle further comprises a second upper bracket at its upper end and a second lower bracket at its lower end. In one embodiment, the second spindle further comprises a second support gusset configured to strengthen the joints by transferring the stress between the connecting points. In one embodiment, the vehicle lift kit further comprises one or more second grease fittings configured to provide lubrication of the mounting points. In one embodiment, the upper end of the spindle is attached to a tie rod of the vehicle via the upper bracket for steering.

In one embodiment, the vehicle lift kit further comprises a pair of upper control arms including a first upper control arm and a second upper control arm. The upper control arms are configured to connect between a steering rack mount of the vehicle and the upper end of the spindles. In one embodiment, the upper control arms are connected between the steering rack mount of the vehicle and the upper brackets of the spindles respectively. In one embodiment, each upper control arm has a shock mount at its proximal end.

In one embodiment, the first upper control arm has a first arm member. In one embodiment, the first upper control arm further comprises a first shock mount at the proximal end of the first arm member. In one embodiment, the first upper control arm further comprises a first camber alignment adjustment. The second upper control arm has a second arm member. In one embodiment, the second upper control arm further comprises a second shock mount at the proximal end of the second arm member. In one embodiment, the second upper control arm further comprises a second camber alignment adjustment.

In one embodiment, a method for installing the vehicle lift kit for the golf cart comprises the following steps. At one step, a pair of upper control arms are installed to a steering rack mount. At another step, a front suspension is attached to a frame plate using a retained spring plate and supplied washer. In one embodiment, the front suspension comprises a pair of lower control arms. At another step, a pair of spindles are attached to the pair of lower control arms and the pair of upper control arms. In one embodiment, each spindle comprises a spindle shaft, an upper bracket, and a lower bracket. At another step, a pair of shock mount are attached to the pair of upper control arms and a tie rod to the spindle shaft. At another step, a kingpin support or king bolt nut is tightened on top of the spindle shaft. At another step, the wheel hubs are reattached and back nut off quarter to half a turn, thereby allowing the wheel-hubs to spin freely.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

The present invention is best understood by reference to the detailed figures and description set forth herein.

It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
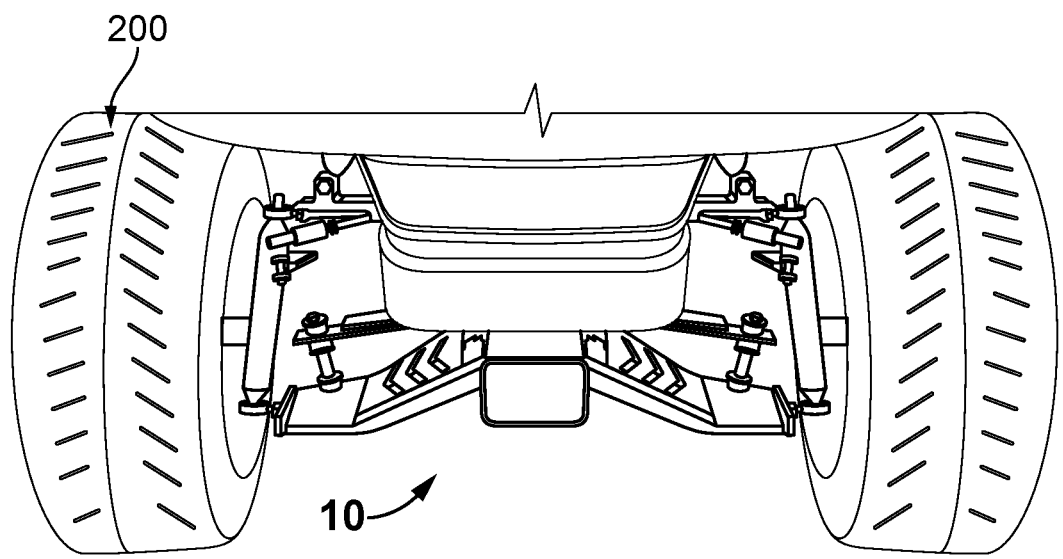
FIG. 1 shows a prior art vehicle lift kit mounted on a cart.
Figure 2:
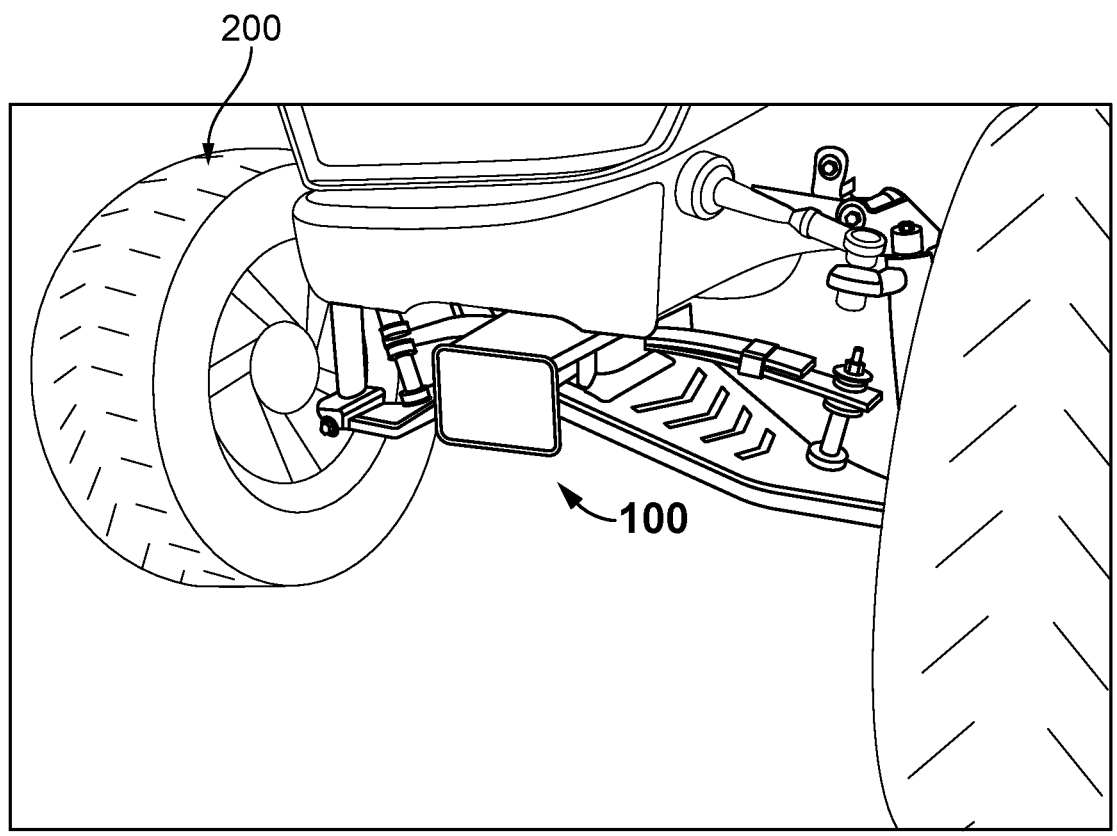
FIG. 2 shows a perspective view of a vehicle lift kit mounted on a cart in a typical use case in one embodiment of the present invention.

Referring to FIG. 2, a perspective view of a vehicle lift kit 100 mounted on a golf cart 200 in a typical use case, according to one embodiment of the present invention. In one embodiment, the vehicle lift kit 100 is provided with an improved joint for controlling golf carts. In one embodiment, the vehicle lift kit 100 further provided with a shock mount at both the control arms to withstand weight and impact on the suspension. In one embodiment, the vehicle lift kit 100 further comprises a rear suspension kit for golf cart 200.

Figure 3:
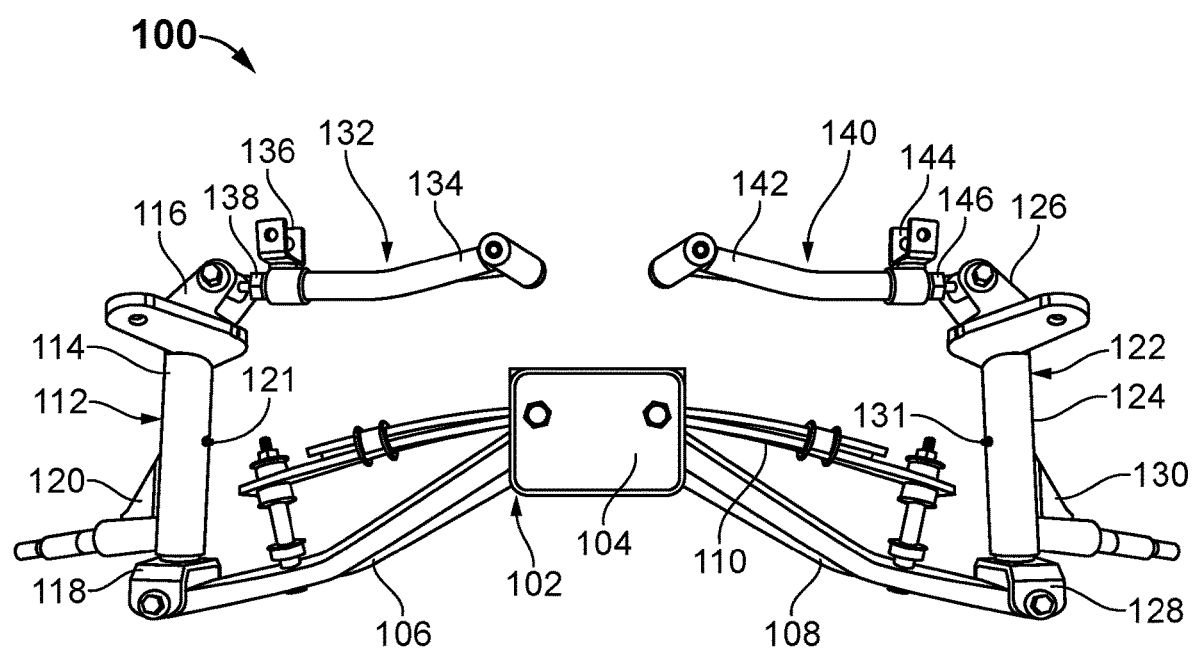
FIG. 3 shows a front view of the vehicle lift kit in one embodiment of the present invention.
Figure 4:
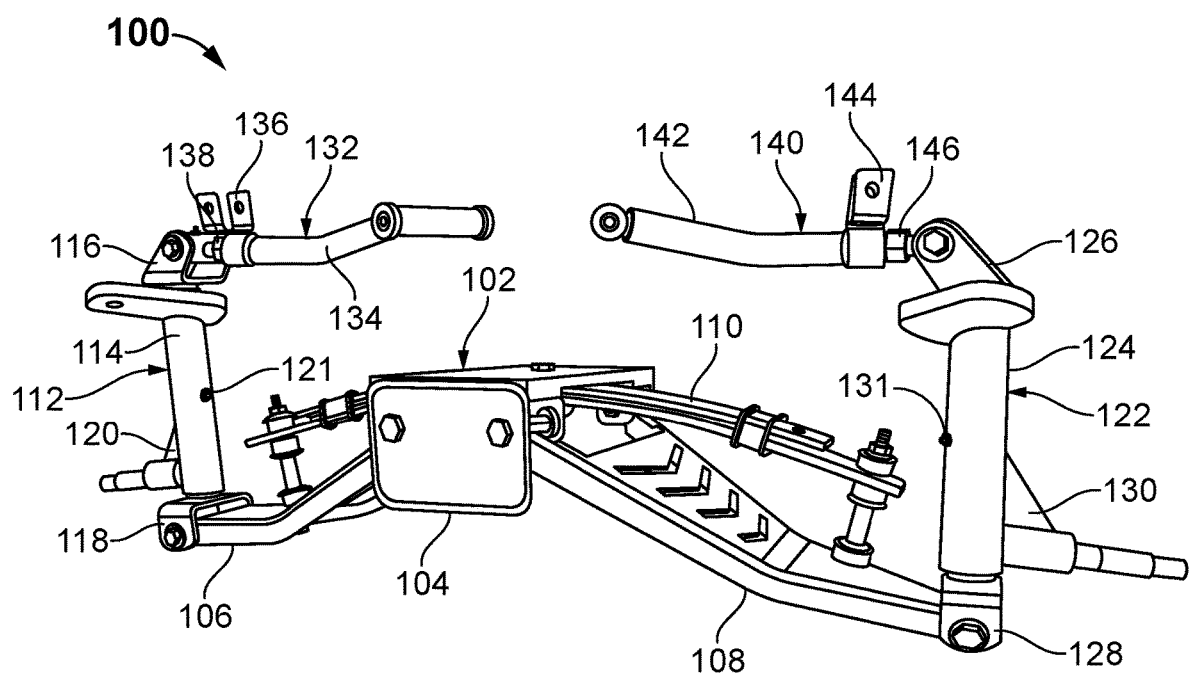
FIG. 4 shows a front perspective view of the vehicle lift kit in one embodiment of the present invention.

Referring to FIGS. 3-4, a front view and a front perspective view of the vehicle lift kit 100 respectively, according to one embodiment of the present invention. The vehicle lift kit 100 comprises a front suspension 102 configured to attach to a vehicle frame. In one embodiment, the front suspension 102 comprises a suspension body or front frame 104, a pair of lower control arms, and a leaf spring. In one embodiment, the pair of lower control arms include a first lower control arm 106 and a second lower control arm 108. In one embodiment, the lower control arms (106 and 108) are extending laterally from the sides of the suspension body 104. In one embodiment, the leaf spring 110 extends laterally from the sides of the suspension body 104.

In one embodiment, the vehicle lift kit 100 further comprises a pair of spindles including a first spindle 112 and a second spindle 122. In one embodiment, the spindles (112 and 122) are configured to connect to the distal end of the lower control arms (106 and 108), respectively. Each spindle comprises a spindle shaft, an upper bracket, and a lower bracket. The spindle shaft includes an upper brass bushing at its upper end and a lower brass bushing at its lower end.

In one embodiment, the first spindle 112 comprises a first spindle shaft 114 having an upper end and a lower end. The first spindle 112 further comprises a first upper bracket 116 at its upper end and a first lower bracket 118 at its lower end. In one embodiment, the first spindle 112 further comprises a first support gusset 120 configured to strengthen the joints by transferring the stress between the connecting points. In one embodiment, the vehicle lift kit 100 further comprises one or more first grease fittings 121 configured to provide lubrication of the mounting points.

In one embodiment, the second spindle 122 comprises a spindle shaft 124 having an upper end and a lower end. The second spindle 122 further comprises a second upper bracket 126 at its upper end and a second lower bracket 128 at its lower end. In one embodiment, the second spindle 122 further comprises a second support gusset 130 configured to strengthen the joints by transferring the stress between the connecting points. In one embodiment, the vehicle lift kit 100 further comprises one or more second grease fittings 131 configured to provide lubrication of the mounting points. In one embodiment, the upper end of the spindle (112 and 122) is attached to a tie rod of the vehicle via the upper bracket (116 and 126) for steering.

In one embodiment, the vehicle lift kit 100 further comprises a pair of upper control arms including a first upper control arm 132 and a second upper control arm 140. The upper control arms (132 and 140) are configured to connect between a steering rack mount of the vehicle and the upper end of the spindles (112 and 122). In one embodiment, the upper control arms (132 and 140) are connected between the steering rack mount of the vehicle and the upper brackets (116 and 126) of the spindles (112 and 122) respectively. In one embodiment, each upper control arm (132 and 140) has a shock mount at its proximal end.

In one embodiment, the first upper control arm 132 has a first arm member 134. In one embodiment, the first upper control arm 132 further comprises a first shock mount 136 at the proximal end of the first arm member 134. In one embodiment, the first upper control arm 132 further comprises a first camber alignment adjustment 138. The second upper control arm 140 has a second arm member 142. In one embodiment, the second upper control arm 140 further comprises a second shock mount 144 at the proximal end of the second arm member 142. In one embodiment, the second upper control arm 140 further comprises a second camber alignment adjustment 146.

Figure 5:
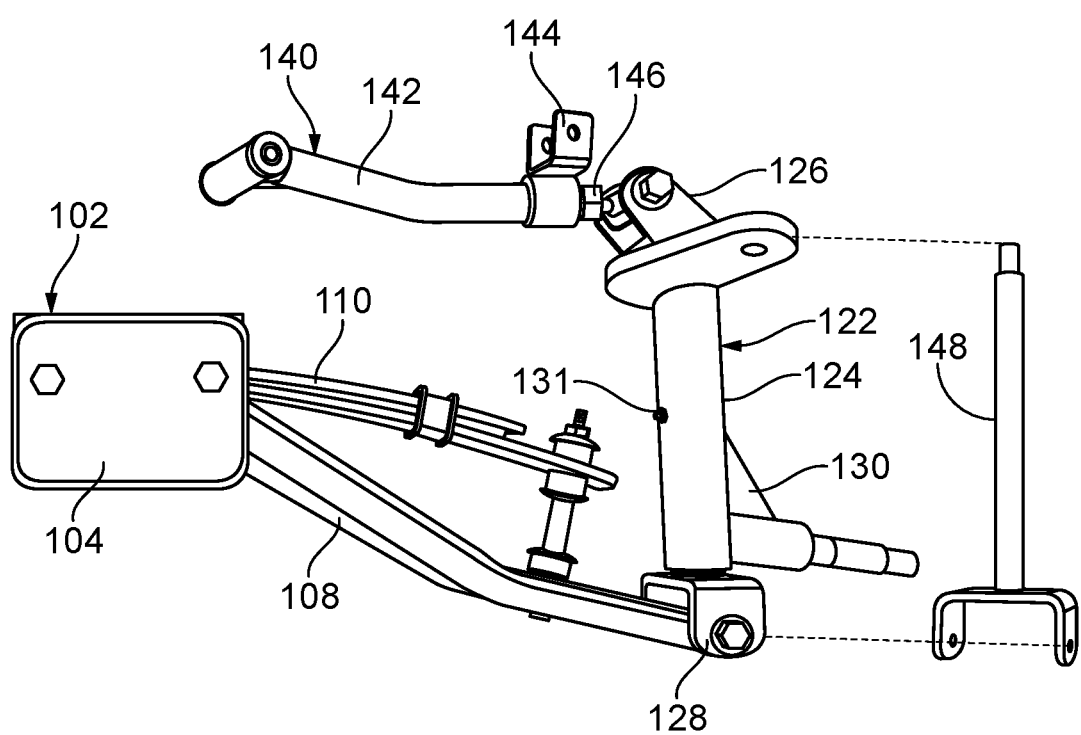
FIG. 5 shows a front perspective view of a driver side components of the vehicle lift kit in one embodiment of the present invention.

Referring to FIG. 5, a front perspective view of a driver side components of the vehicle lift kit 100, according to one embodiment of the present invention. In one embodiment, the vehicle lift kit 100 comprises a front suspension 102 configured to attach to a vehicle frame. In one embodiment, the front suspension 102 comprises a suspension body or front frame 104, a lower control arm 108, and a leaf spring 110. In one embodiment, the lower control arm 108 and the leaf spring 110 are extending laterally from the sides of the suspension body 104. In one embodiment, the vehicle lift kit 100 further comprises a spindle 122 configured to connect to the distal end of the lower control arm 108. The spindle 122 comprises a spindle shaft 124, an upper bracket 126, and a lower bracket 130. In one embodiment, the spindle shaft 124 is a hollow tube configured to slide over a kingpin support 148. In one embodiment, the kingpin support 148 is configured to provide improved durability over rod end bearing or Heim joint or rose joint design of prior lift kits. In one embodiment, the combination of spindle 122 and the kingpin support 148 eliminates the rod end bearings of Heim joints. In one embodiment, the vehicle lift kit 100 further comprises an upper control arm 140 configured to connect between a steering rack mount of the vehicle and the upper end of the spindle 122. In one embodiment, the upper control arm 140 has a shock mount 144 at its proximal end. In one embodiment, the upper control arm 140 further comprises a camber alignment adjustment 146.

Figure 6:
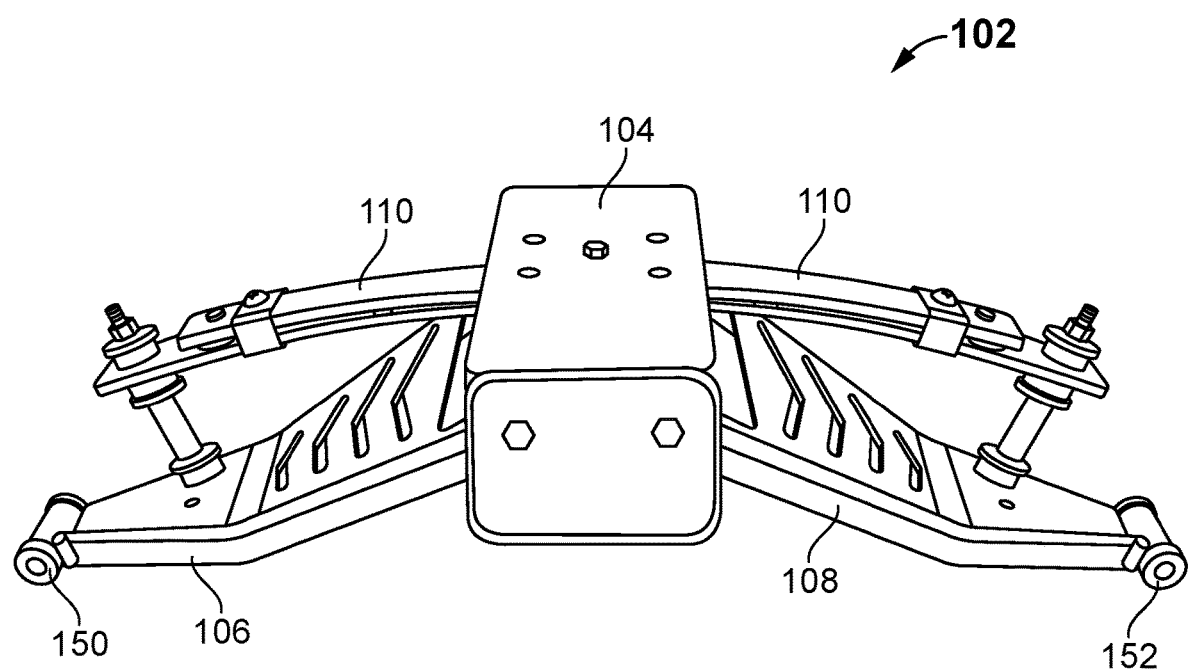
FIG. 6 shows a front perspective view of a front suspension in one embodiment of the present invention.

Referring to FIG. 6, a front perspective view of a front suspension 102, according to one embodiment of the present invention. The front suspension 102 is configured to attach to a vehicle frame. In one embodiment, the front suspension 102 comprises a suspension body or front frame 104, a pair of lower control arms, and a leaf spring. In one embodiment, the pair of lower control arms include a first lower control arm 106 and a second lower control arm 108. In one embodiment, the lower control arms (106 and 108) are extending laterally from the sides of the suspension body 104. Each lower control arm (106 and 108) has a first end and a second end. The first end of each lower control arm (106 and 108) is a proximal end, which is attached to the suspension body 104. The second end of each lower control arm (106 and 108) is a distal end. In one embodiment, each lower control arm (106 and 108) has at least one mounting point at its distal end. The first lower control arm 106 has a first mounting point 150 at its distal end. The second lower control arm 108 has a second mounting point 152 at its distal end. In one embodiment, the leaf spring 110 extends laterally from the sides of the suspension body 104. The leaf spring 110 has a first end and a second end. The first end is attached to the suspension body 104. The second end is attached to the lower control arms (106 and 108) proximal to the distal end.

Figure 7A:
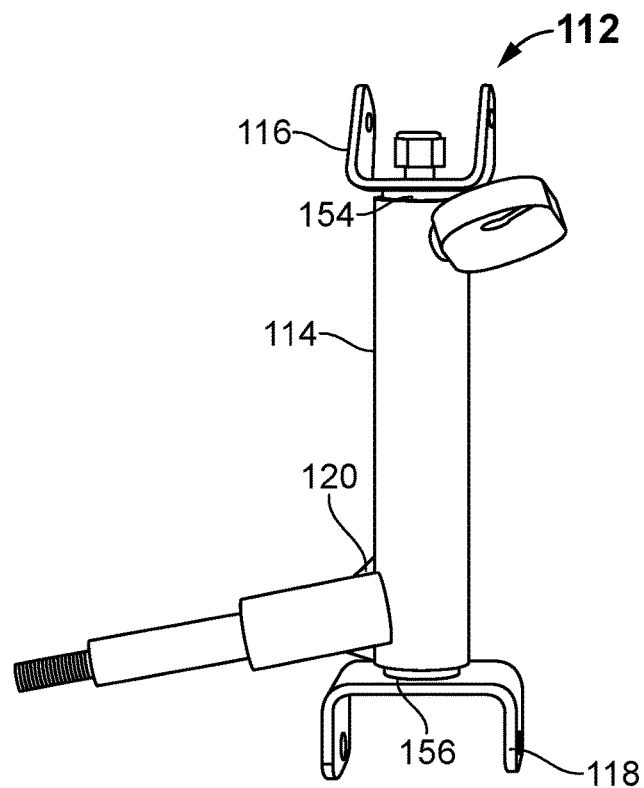
FIGS. 7A-7B show a perspective view of a pair of spindles in one embodiment of the present invention.

Referring to FIG. 7A, a perspective view of a first spindle 112, according to one embodiment of the present invention. In one embodiment, the first spindle 112 comprises a first spindle shaft 114 having an upper end and a lower end. The first spindle 112 further comprises a first upper bracket 116 at its upper end and a first lower bracket 118 at its lower end. In one embodiment, the first spindle 112 further comprises a first support gusset 120 configured to strengthen the joints by transferring the stress between the connecting points. In one embodiment, the first spindle shaft 114 includes a first upper brass bushing 154 at its upper end and a first lower brass bushing 156 at its lower end.

Figure 7B:
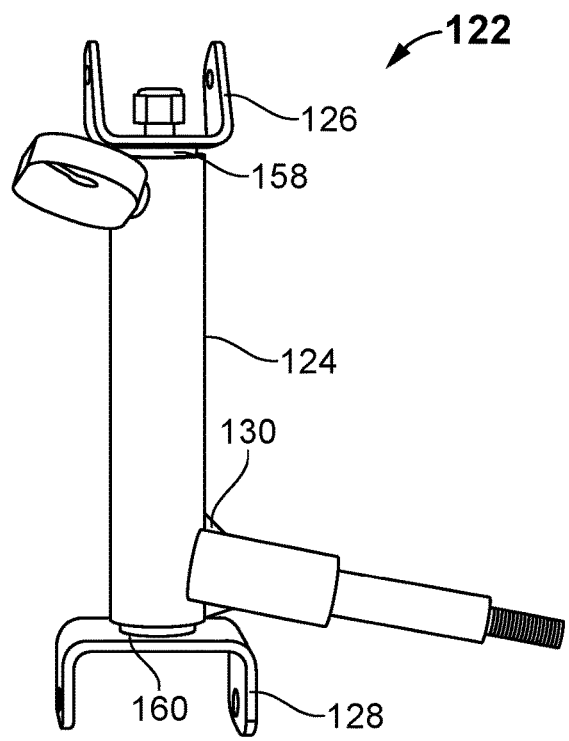

Referring to FIG. 7B, a perspective view of a second spindle 122, according to one embodiment of the present invention. In one embodiment, the second spindle 122 comprises a second spindle shaft 124 having an upper end and a lower end. The second spindle 122 further comprises a second upper bracket 126 at its upper end and a second lower bracket 128 at its lower end. In one embodiment, the second spindle 122 further comprises a second support gusset 130 configured to strengthen the joints by transferring the stress between the connecting points. In one embodiment, the second spindle shaft 124 includes a second upper brass bushing 158 at its upper end and a second lower brass bushing 160 at its lower end.

Figure 8A:
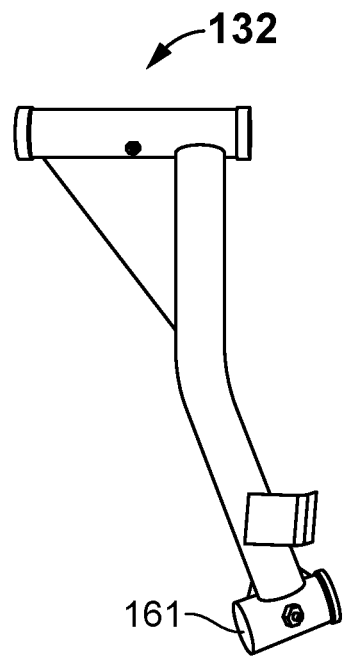
FIGS. 8A-8B show a perspective view of a pair of upper control arms in one embodiment of the present invention.
Figure 8B:
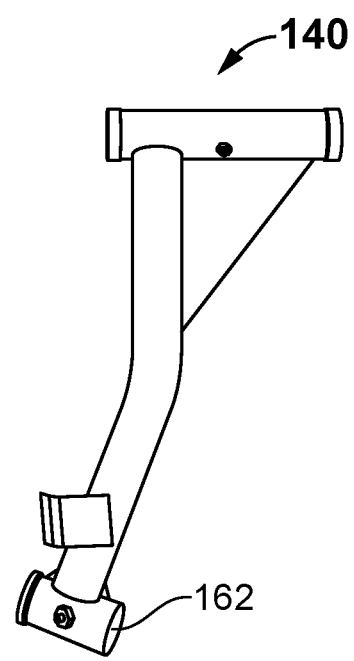

Referring to FIGS. 8A-8B, a perspective view of a first upper control arm 132 and a second upper control arm 140, respectively, according to one embodiment of the present invention. Each upper control arm (132 and 140) has an arm member (134 and 142). In one embodiment, each upper control arm (132 and 140) further comprises a shock mount (136 and 144) at the proximal end. In one embodiment, the upper control arms (132 and 140) further comprise a camber alignment adjustment (138 and 146) as clearly shown in FIG. 3. In one embodiment, the upper control arms (132 and 140) further comprise a mounting member configured to connect with the upper end of the spindles (112 and 122) respectively. In one embodiment, the first upper control arm 132 has a first mounting member 161 configured to connect with the upper end of the first spindle 112. In one embodiment, the second upper control arm 140 has a second mounting member 162 configured to connect with the upper end of the second spindle 122.

Figure 9A:
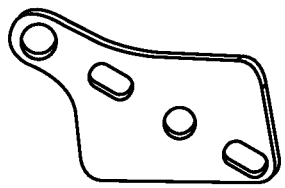
FIGS. 9A-9B show a perspective view of a pair of rear shock plates in one embodiment of the present invention.
Figure 9B:
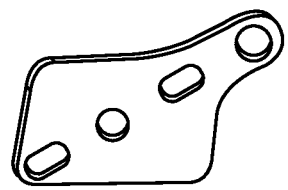

Referring to FIGS. 9A-9B, a perspective view of a pair of rear shock plates (164 and 166), according to one embodiment of the present invention. During the rear lift of cart 200, the rear shock plates (164 and 166) are placed on top of the leaf spring 110. The rear shock to shock plate is hand-tightened using retained bushings and fasteners. The fasteners could be socket and wrench. The socket could be 10 mm socket. The wrench could be 13 mm wrench.

Figure 10A:
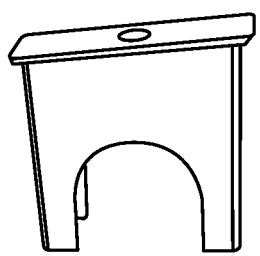
FIGS. 10A-10B show a perspective view of a pair of rear lift blocks in one embodiment of the present invention.
Figure 10B:
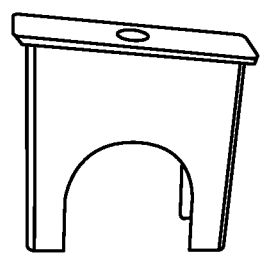

Referring to FIGS. 10A-10B, a perspective view of a pair of rear lift blocks (168 and 170), according to one embodiment of the present invention. During the rear lift of cart 200, the rear lift blocks (168 and 170) are placed on axle and under leaf spring 110. the rear lift block (168 and 170) could be taller blocks or shorter blocks. The taller blocks are used while installing single factory spring leaf. The smaller blocks are used while installing heavy-duty leaf spring.

Figure 11A:
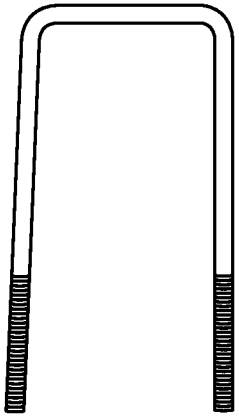
FIGS. 11A-11B show a perspective view of a pair of rear U-bolts in one embodiment of the present invention.
Figure 11B:
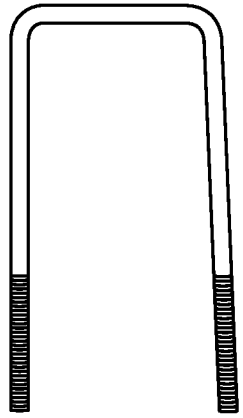

Referring to FIGS. 11A-11B, a perspective view of a pair of rear U-bolts (172 and 174), according to one embodiment of the present invention. A socket is used to loosen the U-bolts (172 and 174) at the passenger's side rear use and retained, thereby allowing flexibility while installing the lift kit on the opposite side. The socket is used to remove the U-bolts (172 and 174) at the driver's side use. The supplied U-Bolts (172 and 174) and hardware, route the U-bolt through the shock mounting plate and down through the factory spring mount. Once both ends of the U-bolt (172 and 174) are in place, the hardware is tightened. The leaf spring nut is properly sitting inside the new shock mounting plate hole and the Allen head bolt is recessed in the factory spring plate while tightening hardware.

Figure 12:
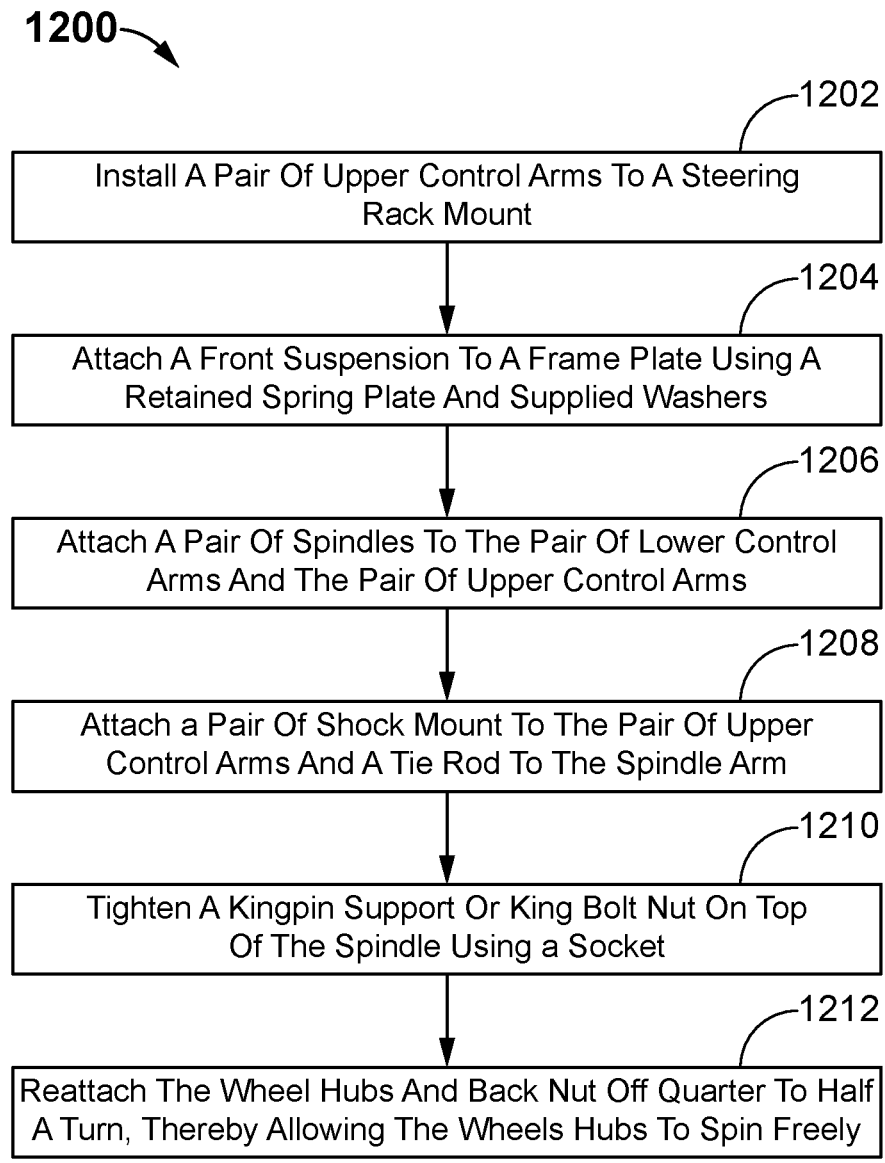
FIG. 12 shows a method of installing a vehicle lift kit for a golf cart in one embodiment of the present invention.

Referring to FIG. 12, a method 1200 for installing the vehicle lift kit 100 for golf cart 200, according to one embodiment of the present invention. The vehicle lift kit 100 has an improved double arm front suspension 102 configured to provide improved control over the cart lift. The following steps are performed before initiating the installation of vehicle lift kit 100. At one step, the golf cart key is switched to OFF position and the parking brake is engaged before initiating the installation procedure. The rear wheels are chocked. The cart 200 is placed in TOW or is switched from RUN to TOW position. At another step, the factory wheel covers are removed with a small flat head screw driver before lifting the front of the cart 200 and the break loose front wheel lug nuts with a socket. The socket could be a 19 mm socket. Using a floor jack, the front side of the cart 200 is lifted high enough to allow for new front suspension components and larger tires. The jack stands under frame rails and after the first bend in frames.

At another step, the front bumper and the front bolts are removed using wrench and socket. The wrench could be 10 mm wrench. The socket could be 13 mm deep well socket. At another step, the factory wheels are removed using socket. The socket could be 19 mm socket. In addition, the front wheel hub and flange nuts are removed and retained using a socket. The socket could be 13/16" socket. At another step, the factory shock from the spindle mount using a socket. The socket could be ½" socket. In addition, the nut from the steering link tie rod is removed and retained using a socket. The socket could be 18 mm socket. The tie rod is held in place using a wrench. The wrench could be 11/16" wrench. The both pieces are pushed to be free of factory spindle. The above steps are repeated on passenger side.

At another step, the steering rack from the steering rack mount is removed using a socket. The socket could be ½" socket. With steering rack mount free, turn steering rack to gain access to upper control arms mounting bolts. At another step, the bolts for control arms are removed and retained using a socket. The socket could be ½" socket. The control arms are now free from front mount, which can be removed. At another step, the spring/tow plate is removed and retained using a socket. The socket could be ½" socket. The hardware and front suspension are discarded. When the plate is removed, the entire suspension will be free. The steering racks and shocks are the remaining items.

In one embodiment, the method 1200 comprises the following steps for installing the vehicle lift kit 100. At step 1202, a pair of upper control arms or A-arms (132 and 140) and a pair of lower control arms (106 and 108) are installed to the factory steering rack mount. In one embodiment, the upper control arms (132 and 140) are aligned with an angle to the front of the cart 200. The both upper control arms (132 and 140) are tightened using a socket. The socket could be ½" socket. In one embodiment, the inside fittings of each upper control arm (132 and 140) are greased. Further, the steering rack is reattached with the socket. The socket could be ½" socket. The bolts are held in place and tightened.

At step 1204, a front suspension 102 is attached to the factory frame plate using the retained spring plate and supplied washers. The washers could be 10 mm×50 mm bolts/washers. The bolts are started using the supplied thread lock adhesive and a socket and fully tightened hardware. The socket could be 16 mm socket. In one embodiment, a floor jack could be used to hold the suspension in place. Further, the grease fittings located under the suspension are greased.

At step 1206, the pair of spindles (112 and 122) are attached to the pair of lower control arms or A-arms (106 and 108) and the pair of upper control arms (132 and 140) using the supplied bolts and hardware. In one embodiment, the bolts could be 10 mm×90 mm bolts to attach the spindles (112 and 122) to the lower control arms (106 and 108). In one embodiment, the bolts could be 10 mm×70 mm bolts to attach the spindles (112 and 122) to the upper control arms (132 and 140). In one embodiment, the spindles (112 and 122) are attached to the upper control arms (132 and 140) via the upper brackets (116 and 126). In one embodiment, the spindles (112 and 122) are attached to the lower control arms (106 and 108) via the lower brackets (118 and 128). In one embodiment, the bolts are tightened using a socket and wrench. The socket could be 16 mm socket. The wrench could be 17 mm wrench.

At step 1208, a pair of factory shock or shock mount (136 and 144) is attached to the pair of upper control arms (132 and 140), respectively using the supplied bolt and hardware. The bolt could be 8 mm×50 mm bolt. In one embodiment, the tie rod is attached to the spindle arm using the retained nut. In one embodiment, a cotter pin is installed in the tie rod bolt once nut is fully tightened. In one embodiment, the tie rod is held in place using a wrench and tightened with a socket. The wrench could be 11/16" wrench. The socket could be 18 mm socket. At step 1210, the kingpin support or king bolt nut 148 is tightened on top of the spindle using a socket. The socket could be 19 mm socket. The kingpin support 148 is tightened until there is about 3-4 visible threads. Further, the arm fittings are greased. At step 1212, the wheel hubs are reattached using the retained nuts and tightened all the way, then back nut off quarter to half a turn, thereby allowing the wheel-hubs to spin freely. Now, the front tires and wheels are installed and the jack stands are removed. The tires could be 22-23" tires. The wheels could be 12-14" wheels for proper clearance. Further, the above steps 1202-1212 are repeated on the opposite side.

In one embodiment, the installation of rear lift comprises the following steps. At one step, the parking brake is disengaged and chocks the front wheels. A floor jack is used under the rear axle to lift the rear of the cart 200. The floor jack stands under the frame and on the front side of the forward-most leaf spring mount. Similarly, on the passenger's side rear use a ⅝" socket to loosen the U-bolts (172 and 174), which allows flexibility while installing the lift on the opposite side. At another step, the rear shock from spring plate is loosen with a socket, wherein the shock has to be held in place to keep it from spinning. The socket could be 9/16" socket. At another step, the floor jack is placed under the rear end to support the rear end weight as it may roll or fall if the jack is not in place. At another step, the factory U-bolts are removed with a socket. The socket could be ⅝" socket. In addition, the shock nut and bushings are removed and retained using a socket. The socket could be 9/16" socket.

At another step, the rear leaf spring bolt is removed and retained using a socket and wrench. The socket could be 10 mm socket. The wrench could be 13 mm wrench. At another step, the front leaf spring is removed and retained using a socket and wrench. The socket could be 10 mm socket. The wrench could be 13 mm wrench. The brake cable is removed from the spring bolt. Further, the leaf spring is removed temporarily, thereby allowing the replacement of leaf spring bushings if needed. At another step, the floor jack is lowered enough to install rear lift components. In addition, the leaf spring is installed above the axle using the retained hardware. At another step, the rear lift block is placed on the axle and under the leaf spring. In one embodiment, the short side of the rear lift block faces towards the front of the cart 200. The rear shock plate is placed on top of the leaf spring. In one embodiment, the rear lift block could be taller blocks and/or shorter blocks. The taller blocks are used while installing a single factory leaf spring. The smaller blocks are used while installing heavy duty leaf spring.

At another step, the Allen head center pin bolt, washer, and nut are attached to the factory spring plate using socket and wrench. The socket could be 6 mm Allen head socket. The wrench could be 13 mm wrench. The Allen head bolts are used to keep the spring plate in line with the alignment hole located in the bottom of the axle. At another step, the rear shock and shock plate are tightened by hand using the retained bushings. Using the supplied U-Bolt (172 and 174) and hardware, the U-Bolt is routed through the shock mounting plate and down through the factory spring mount. Once both ends of the U-bolt are in place, tighten hardware. The leaf spring nut is properly sitting inside the new shock mounting plate hole and the Allen head bolt is recessed in the factory spring plate while tightening hardware. All components should be tight together without any gaps. A rubber mallet can be used to align components.

Further, the brake cable is reattached to the front spring bolt. In one embodiment, the cable clamp may be needed to be adjusted forward to reattach. The above steps are repeated on the passenger's side. At another step, new wheels and tires are installed by lowering the cart and proceeding to alignment steps. At another step, the front wheels are aligned properly to avoid decreased ability to control the golf cart 200 which may result in a rollover or crash. In one embodiment, both camber and toe must be adjusted. To adjust for proper camber, use a framing square, level, or some other means of verifying that the tire is at a 90 degree angle to the ground. The kingpin is temporarily removed using a 19 mm socket, nut to adjust the camber. To achieve proper 90 degree camber, adjust upper A-arm shackle in or out as needed. Ensure the wheels are pointing straight forward. A common point is determined to measure from the inside front and inside rear of the front tires to adjust the toe. The toe is adjusted until the front measurement is ¼" greater than the rear measurement. Then, lose the nut on the tie rod end, and adjust the steering rack in or out as needed for proper alignment. The nuts are tightened on the rod end. Ensure that after this adjustment, both wheels toe out from the cart's center-line equally. Once tightened, test drive and re-check tow and camber measurements.

Preferred embodiments of this invention are described herein, including the best mode known to the inventors for carrying out the invention. It should be understood that the illustrated embodiments are exemplary only and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

We claim:

1. A vehicle lift kit for a golf cart, comprising:
a front suspension configured to attach to a vehicle frame, having a suspension body, a pair of lower control arms and leaf springs, each lower control arm and each leaf spring extends laterally from the sides of the suspension body, wherein each lower control arm has a mounting point at its distal end;
a pair of spindles includes a first spindle and a second spindle, wherein the pair of spindles are configured to connect to the distal end of the pair of lower control arms, wherein each spindle comprises a spindle shaft, an upper bracket, and a lower bracket, wherein each spindle includes a kingpin support terminating in each lower bracket; and
wherein the spindle shaft includes an upper brass bushing at its upper end and a lower brass bushing at its lower end;
a pair of upper control arms configured to connect between a steering rack mount of the vehicle and the upper end of the spindle, wherein each upper control arm has a shock mount at a proximal end;
the upper end of the spindle is attached to a tie rod of the vehicle via the upper bracket for steering and the upper brass bushing provides rotational attachment to the upper control arm, and;
each said mounting point at the distal end of each lower control arm provides mounting points on the pair of lower control arms to connect each to the lower end of the spindle via the lower bracket, and each lower brass bushing provides rotational attachment to the respective mounting point;

each said mounting point.

2. The vehicle lift kit of claim 1, wherein the pair of upper control arms and the pair of lower control arms are configured to turn the vehicle via the connection between the upper control arms and the vehicle's steering rack mount.

3. The vehicle lift kit of claim 1, wherein the distal ends of the lower control arms are connected to the lower end of the spindle via the lower bracket.

4. The vehicle lift kit of claim 1, wherein the leaf spring is supported by attaching to the suspension body on one end and the lower control arm on the distal end.

5. The vehicle lift kit of claim 1, further comprises a camber alignment adjustment on the connector between the upper control arm and the upper bracket of the spindle to move the upper bracket and spindle in or out relative to the upper control arm.

6. The vehicle lift kit of claim 5, wherein the camber alignment adjustment is configured to provide alignment of front tires of the golf cart.

7. The vehicle lift kit of claim 1, further comprises a support gusset configured to strengthen the joints by transferring the stress between the connecting points.

8. The vehicle lift kit of claim 1, further comprises one or more grease fittings configured to provide lubrication of the mounting points.

9. The vehicle lift kit of claim 1, further comprises a rear suspension kit for golf cart.

10. A method for installing a vehicle lift kit for a golf cart that comprises the steps of:

installing a pair of upper control arms to a steering rack mount;

attaching a front suspension to the golf cart via a suspension body using a retained spring plate and supplied washer, wherein the front suspension comprises a pair of lower control arms;

attaching a pair of spindles to the pair of lower control arms and the pair of upper control arms, wherein each spindle comprises a spindle shaft;

attaching a pair of shock mount to the pair of upper control arms;

attaching an upper end of each spindle via an upper bracket on each spindle to the cart for steering;

tightening kingpin support or king bolt nut on top of the spindle shaft, and attaching wheel hubs and backing the king bolt nut off a quarter to half a turn, thereby allowing the wheel hubs to spin freely.

11. The method of claim 10, wherein each spindle further comprises an upper bracket and a lower bracket.

12. The method of claim 10, wherein the pair of spindles are attached to the pair of upper control arms via the upper brackets and the pair of lower control arms via the lower brackets.

13. The method of claim 10, further performs readjusting of camber alignment adjustment includes:

removing kingpin nut temporarily to adjust camber alignment adjustment;

adjusting the upper control arm shackle in or out as needed, to achieve proper alignment, and testing and rechecking of camber alignment adjustment.

* * * * *